UNITED STATES PATENT OFFICE.

ALPHONS GAMS, OF BASEL, SWITZERLAND, ASSIGNOR TO SOCIETY OF CHEMICAL INDUSTRY IN BASLE, OF BASEL, SWITZERLAND.

ALLYLESTER OF THE 2-PHENYLQUINOLIN-4-CARBOXYLIC ACID.

1,336,952.

Specification of Letters Patent.  Patented Apr. 13, 1920.

No Drawing.  Application filed May 29, 1919. Serial No. 300,659.

*To all whom it may concern:*

Be it known that I, ALPHONS GAMS, a citizen of the Swiss Republic, and resident of Basel, Switzerland, have invented a new and useful Allylester of the 2-Phenylquinolin-4-Carboxylic Acid, of which the following is a full, clear, and exact specification.

It is known that by the action of alkylhalids on the salts of 2-phenylquinolin-4-carboxylic acid alkylesters of this acid are obtained, which possess certain advantages over the free acid, namely the advantage of tastelessness.

I have now found, that the same advantages belong to the allylester of the said 2-phenylquinolin-4-carboxylic acid, which has over the alkylesters the further advantage to dissolve the uric acid more easily than the said acid itself, while the introduction of an alkyl group in the said acid does not increase the specific dissolving action of this acid on uric acid.

All known methods for the esterification of acids can be employed for the preparation of the new allylester. For instance a salt of the 2-phenylquinolin-4-carboxylic acid can be decomposed by an allylhalid in a convenient solvent or gaseous dry hydrochloric acid can be introduced into an allylalcoholic solution of the 2-phenylquinolin-4-carboxylic acid, or this latter solution can be heated with a little quantity of concentrated sulfuric acid or the chlorid of 2-phenylquinolin-4-carboxylic acid can be brought to react with allylalcohol, etc.

The allylester of 2-phenylquinolin-4-carboxylic acid is entirely tasteless, boils *in vacuo* (under a pressure of 15 m.m. of mercury) at 260° C. and melts at 30° C. It crystallizes from alcohol in long needles, is insoluble in water, readily soluble in alcohol, ether, acetone and oils. Its hydrochlorid constitutes, when recrystallized from strong alcohol, small citron-yellow needles melting at 145 to 147° C., which are insoluble in ether and readily soluble in hot alcohol. By adding water to the said hydrochlorid, it is instantaneously split into the ester and hydrochloric acid. The hydrochlorid possesses a weakly sweet taste.

*Example 1.*

100 gr. of sodium 2-phenylquinolin-4-carboxylate are dissolved in 50 c. cm. of acetone, heated to boiling, on the water-bath, in a receptacle provided with a reflux cooler and hereafter 50 gr. allylbromid (or an equivalent quantity of allylchlorid) are added thereto. The reaction being completed, that is to say, after about 6 hours, the acetone and the allylating agent still present are distilled off. The residue is dissolved in a separating funnel and the resulting solution in ether is washed first with a dilute solution of sodium carbonate and afterward with water and finally dried over calcium chlorid.

If alcoholic hydrogen chlorid is added to the dry solution in ether, the hydrochlorid of the new allyl ester is precipitated in the form of a yellow crystalline precipitate.

For its purification the free ester is distilled *in vacuo*. Hereby the ester distils at 260° under a pressure of 15 m.m. of mercury and is collected in the form of a weakly yellowish oil, from which, after cooling with ice, feebly yellowish colored needles separate.

*Example 2.*

250 gr. of 2-phenylquinolin-4-carboxylic acid are dissolved in an excess of allylalcohol, the solution obtained is heated to boiling in a recipient provided with a reflux cooler and afterward gaseous hydrogen chlorid is introduced into the said solution until saturation. Hereafter the alcohol is distilled off on a water bath under a reduced pressure and the residue is extracted with ether. In order to separate the hydrogen chlorid and the 2-phenylquinolin-4-carboxylic acid in excess, the solution in ether is washed first with a solution of sodium carbonate and afterward with water. After the ether has been distilled off, the ester remains as a thick oil which concretes on ice.

*Example 3.*

270 gr. of chlorid of 2-phenylquinolin-4-carboxylic acid are dissolved in benzene and heated with an excess of allylalcohol on the water bath, until no more hydrochloric acid escapes. The reaction being achieved, the benzene and the allylalcohol are distilled off *in vacuo* and the residue is poured into water. The further isolation of the ester is effected as in Example 2.

What I claim is:

As a new article of manufacture the herein described allylester of 2-phenylquinolin-4-carboxylic acid, which dissolves uric acid more easily than the 2-phenylquinolin-4-carboxylic acid and its alkyl esters, is entirely tasteless, boils *in vacuo* (under a pressure of 15 m.m. of mercury) at 260° C., melts at 30° C., crystallizes from alcohol in long needles, is insoluble in water, readily soluble in alcohol, ether, acetone and oils and forms a hydrochlorid constituting, when recrystallized from strong alcohol, small citron-yellow needles melting at 145 to 147° C., insoluble in ether and readily soluble in hot alcohol, being instantaneously split into the ester and hydrogen chlorid, when it comes into contact with water, and possessing a weakly sweet taste.

In witness whereof I have hereunto signed my name this 30th day of April, 1919, in the presence of two subscribing witnesses.

Dr. ALPHONS GAMS.

Witnesses:
 Scott Taggart,
 Amand Beame.